(12) United States Patent
Ehn et al.

(10) Patent No.: US 6,351,592 B1
(45) Date of Patent: Feb. 26, 2002

(54) MULTI-PURPOSE COMMUNICATIONS CABINET

(75) Inventors: Michael W. Ehn, Dexter; Todd Theisen, Grosse Ile, both of MI (US)

(73) Assignee: Netrix Technologies, Inc., Livonia, MI (US)

( * ) Notice: Subject to any disclaimer, the term of this patent is extended or adjusted under 35 U.S.C. 154(b) by 0 days.

(21) Appl. No.: 09/697,565

(22) Filed: Oct. 26, 2000

Related U.S. Application Data

(62) Division of application No. 09/329,675, filed on Jun. 10, 1999.
(60) Provisional application No. 60/089,254, filed on Jun. 12, 1998.

(51) Int. Cl.[7] .................................................. G02B 6/00
(52) U.S. Cl. ...................... 385/135; 385/136; 174/65 R
(58) Field of Search ................................. 385/134, 135, 385/137, 90, 91, 98, 136; 174/52.3, 65 R, 65 SS, 65 G, 135, 151

(56) References Cited

U.S. PATENT DOCUMENTS

| | | | |
|---|---|---|---|
| 5,472,160 A | * 12/1995 | Burek et al. | 385/134 |
| 5,696,864 A | * 12/1997 | Smith et al. | 385/135 |
| 5,732,180 A | * 3/1998 | Kaplan | 385/135 |
| 5,886,300 A | 3/1999 | Strickler | 174/135 |
| 5,933,563 A | 8/1999 | Schaffer et al. | 385/135 |

* cited by examiner

*Primary Examiner*—Cassandra Spyrou
*Assistant Examiner*—Euncha Cherry
(74) *Attorney, Agent, or Firm*—Young & Basile, PC

(57) ABSTRACT

A communications cabinet for use with copper/fiberoptic converters has electrical connections between power, copper and fiberoptic conductors and the converters preformed as conductive traces on a printed circuit board mountable in a housing. Electrical connections between power, copper and fiberoptic conductors passing through apertures in the housing and corresponding connections to the converters are made through a patch field formed of connectors mounted in the housing, each receiving terminal connectors on the conductors and converter terminations. Seal members are mounted in the housing adjacent apertures through one wall of the housing for sealingly encompassing the copper, fiberoptic and/or the power conductors passing through the apertures in the housing. The printed circuit board receives the converters in a plug-in mount without separate fasteners. An extension cabinet is fixed to the housing and receives power conductor and cables. A DC to AC converter in the extension cabinet supplies AC power to devices mounted in a rack formed in the extension cabinet.

8 Claims, 11 Drawing Sheets

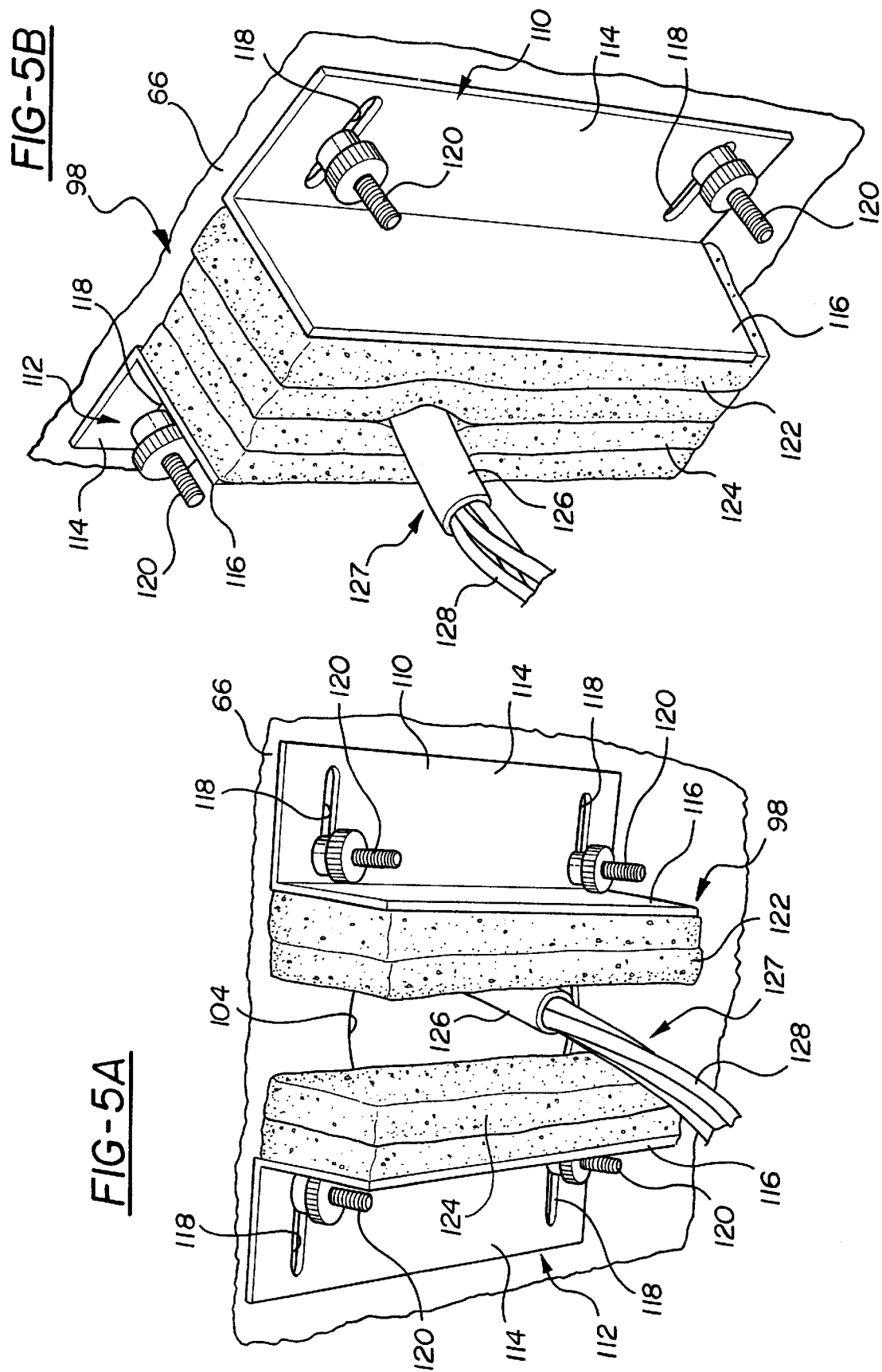

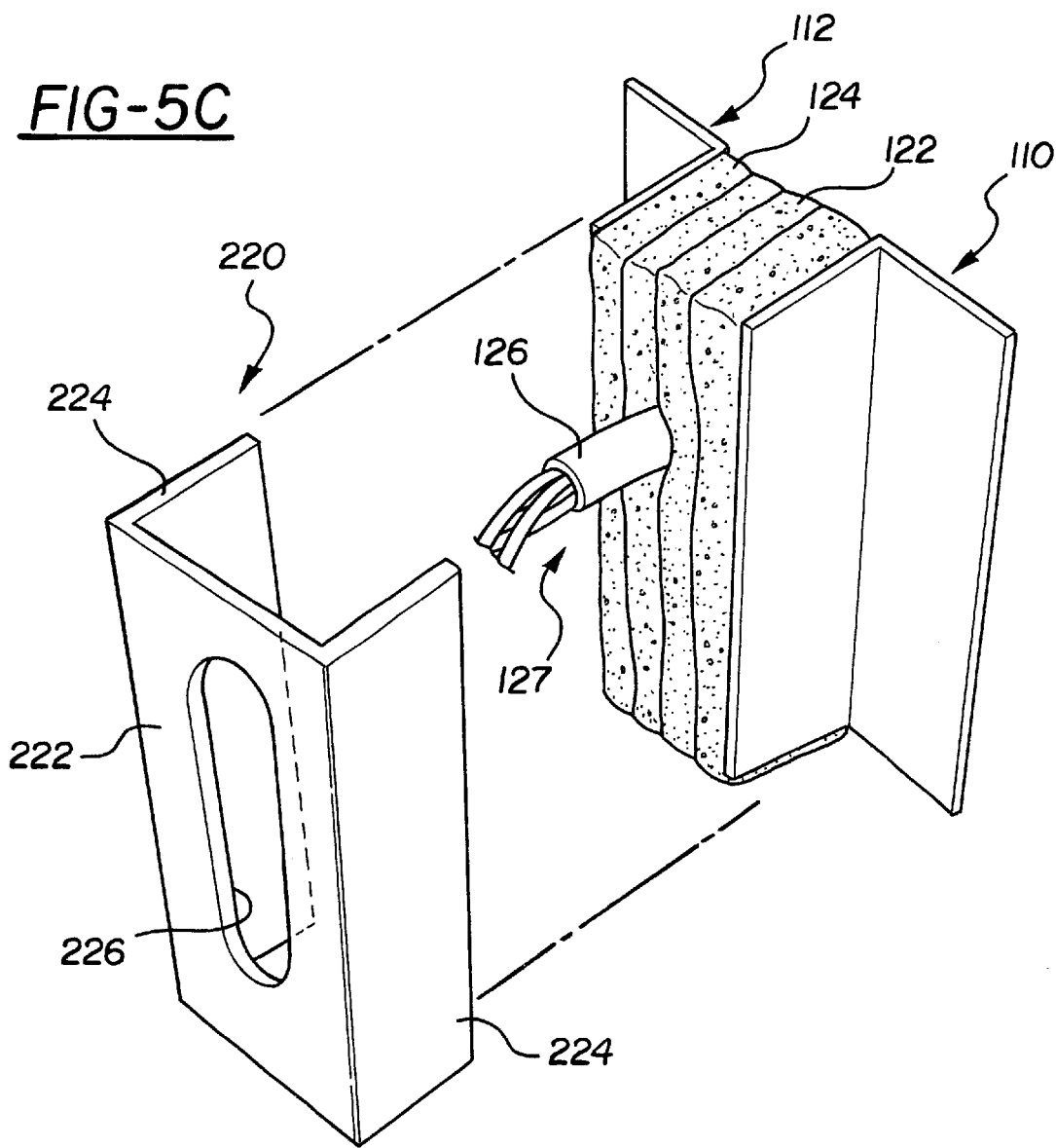
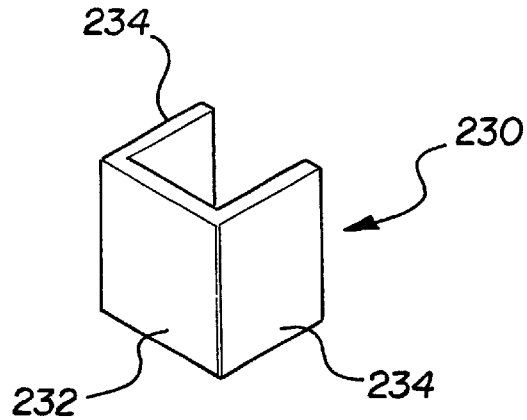

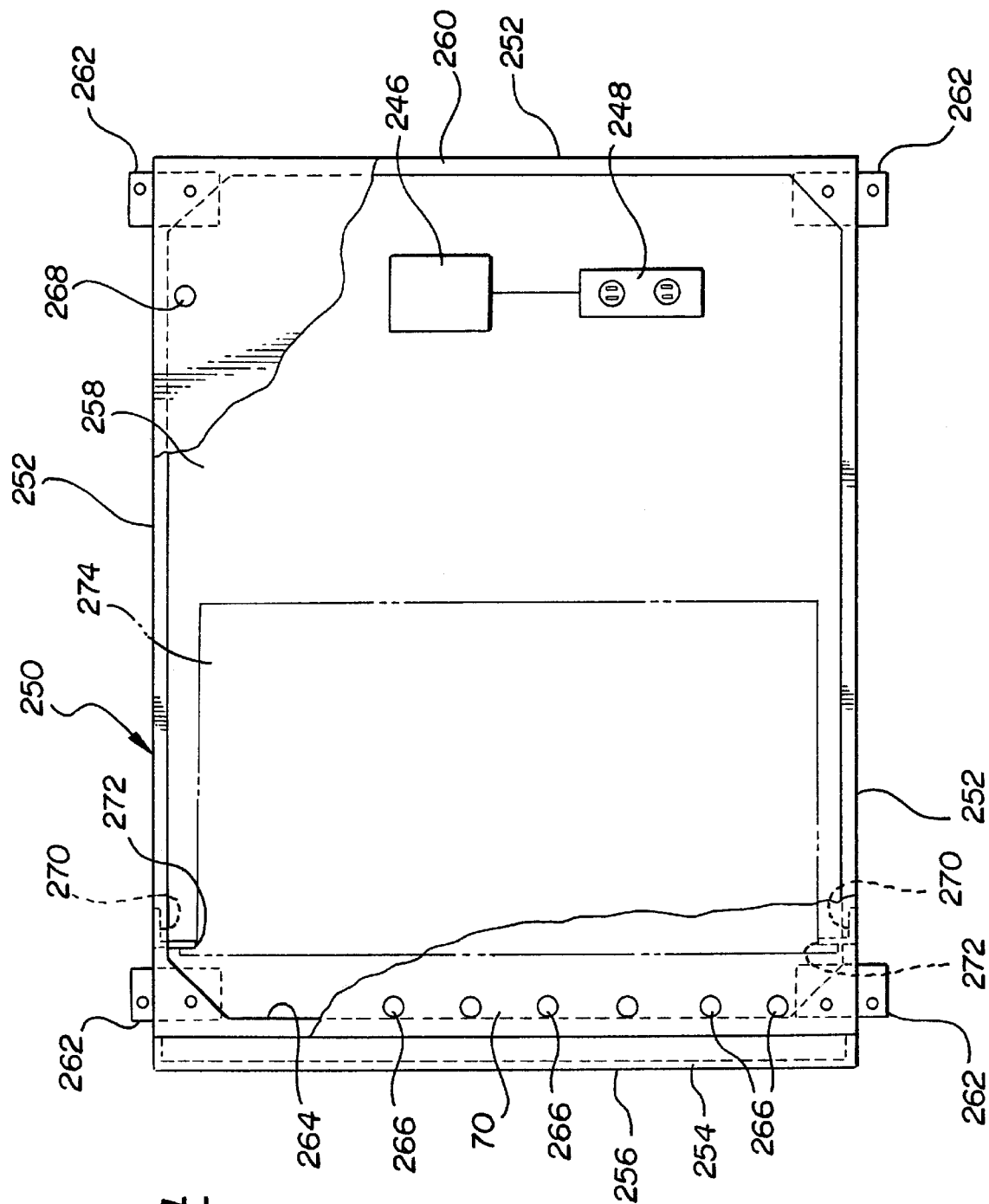

MULTI-PURPOSE COMMUNICATIONS CABINET

CROSS REFERENCE TO CO-PENDING APPLICATION

This application is a divisional application of U.S. patent application Ser. No. 09/329,675, filed Jun. 10, 1999, in the names of William W. Ehn and Todd Theisen and entitled "Multi-Purpose Communications Cabinet", which claimed the benefit of the priority date of provisional patent application Ser. No. 60/089,254 filed Jun. 12, 1998.

BACKGROUND

1. Field of the Invention

The present invention relates, in general, to communication equipment.

2. Description of the Art

Data and/or voice communication frequently employ an enclosure or cabinet mounted at a convenient location in a facility, such as a manufacturing plant, to provide interconnection between copper conductors and fiberoptic conductors.

FIGS. 1 and 2 depict a prior art communication cabinet which provides interconnections between copper conductors and fiberoptic conductors. The cabinet 10 is a typical NEMA enclosure formed of a back wall 12, side walls 14, 16, 18 and 20, a front wall 22 in the form of a narrow flange surrounding an opening 24 to the interior of the cabinet 10, and a door 26 pivotally connected along the one side edge of the front wall 22. A back plate 28 is mounted on the back wall 12 and provided a mounting surface for various components.

A plurality of fiberoptic connectors 30, such as conventional SC or ST type fiberoptic connectors, are mounted on the side walls 16 with a jack portion 32 of each connector 30 projecting outwardly from the side wall 16 for receiving a plug termination at one end of a fiberoptic cable, not shown. As is conventional, a typical fiberoptic cable includes 12 individual fiberoptic conductors contained within a thick outer sheath. The sheath is cut back a considerable distance from the end to enable each individual fiberoptic conductors to be attached to a plug for connection to the respective jacks 32 on the side wall 16. This exposes a portion of the thinner, flexible fiberoptic conductors which made the conductors prone to damage or breakage when hit by external objects. In addition, the external mounting of the jack and fiberoptic conductor plug termination do not provide any strain relief thereby increasing the possibility of the fiberoptic conductors breaking free of the respective jacks if subjected to an external force.

A plurality of copper connectors 38 were also mounted on the cabinet 10, generally on the side wall 14. The copper conductor connectors 38 were of typical construction, such as a RJ45 jack. Finally, a plurality of light emitting diodes (LEDs) 40 are mounted on the side wall 14 to provide an indication of the operative state of certain components within the cabinet 10.

A 48 VDC power receptacle 42 is mounted on the side wall 16 for receiving a plug connected to a 48 volt DC power supply. Internal conductors connect the receptacle 42 to a pair of power supplies 44 mounted on the back plate 28. The power supplies 44 provide regulated 24 VDC and 12 VDC power to circuit breakers connected to copper/fiberoptic converters and a radio, as described hereafter.

The circuit breakers 46 are mounted in a housing 48 on the back plate 28 and individually connected to the 24 VDC and 12 VDC power supplies and to each copper/fiberoptic converter and the radio by individual wires extending from each circuit breaker 46 through terminals 50 to the power connections of each converter 52 and the radio.

Individual conductors are wired from each fiberoptic connector 30 and each copper connector 38 to the respective copper conductor and fiberoptic conductor connections on each converter 52. In addition, individual conductors are wired from each indicator or LED 40 to each component whose status was to be monitored, such as each circuit breaker 46, each converter 52, each power supply 44; etc.

As is evident from FIG. 1, the communications cabinet 10 requires a considerable amount of individual wiring and terminations to connect the circuit breakers 46 and the LEDs 40 to each component within the cabinet as well as to connect the power supplies 44 to the circuit breakers 46. This amount of wiring not only increased the manufacturing costs due to the considerable length of time required to initially construct and wire the cabinet 10, but the conductors are prone to faults which require a considerable amount of trouble shooting time to locate and correct. In addition, the converters 52 are individually hard wired to the circuit breakers 46 via the terminals 50. All of these problems were in addition to the problems are described above with respect to the external mounting of the individual copper and fiberoptic conductors to the respective copper and fiberoptic connectors.

Thus, it would be desirable to provide a communications cabinet or enclosure which overcomes the problems of previously devised, communications enclosures. It would be desirable to provide a communications enclosure which has a considerable amount of pre-wiring connections provided in a printed circuit board as well as providing plug-in connections between the power converters and the circuit board to minimize the amount of individual wires and assembly time required to construct the communications cabinet.

SUMMARY

The present invention is a communications cabinet which provides connections between fiberoptic conductors, copper conductors, and copper/fiber converters.

According to one aspect of the invention, the communications cabinet includes a housing having walls. A plurality of copper/fiberoptic converters are mounted in the housing. Sealable access means are also mounted in the housing for sealingly enclosing the passage of fiberoptic and copper conductors through at least one wall of the housing. In this aspect, each of the sealable access means includes a pair of resilient members, each mounted on a bracket and facing the opposed resilient member. The resilient members and brackets are movable relative to each other between a first spaced apart position allowing passage of an electrical conductor through an adjacent aperture in the housing wall into the interior of the housing, and a second closed position wherein the resilient members sealingly encompass substantially the entire peripheral surface of the conductor extending therethrough.

A clip may be mountable over the brackets when the brackets and the resilient members are in the second closed position to forcibly retain the brackets and the resilient members in the closed position. According to this aspect of the invention, the clip comprises a pair of clips attachable to spaced portions of the brackets. In another aspect, the clip is in the form of an elongated, single member extending over a substantial portion of each bracket pair. An aperture is formed in the elongated clip allowing a conductor extending through the aperture in the housing and the resilient members to pass through the clip. In this embodiment, the clip provides strain relief to the conductor.

According to another aspect of the present invention, the fiberoptic and copper conductors, each have an end disposed in the housing terminating in a first electrical connector. A plurality of conductors extend from the copper/fiber converters, each terminating in a second connector. A plurality of third connectors are mounted in the housing for interconnecting one first connector and one second connector. Preferably, the third connectors are arranged in a plurality of groups in the housing, one group exclusively receiving the connectors on the copper conductors and one group exclusively receiving the connectors on the fiberoptic conductors. According to another unique aspect of the invention, a barrier is mounted within the housing dividing the housing into two separate compartments. The third connectors are preferably mounted on the barrier.

According to another aspect of the present invention, a printed circuit board is mounted in the housing and carries conductive traces. The conductive traces complete an electrical circuit between input power connections and each converter. Preferably, connectors are carried on the printed circuit board each in electrical connection with one conductive trace and receive one converter in a snap-in connection. According to this aspect of the invention, an aperture is formed in the printed circuit board having opposed side edges. The connectors are mounted on one side edge of the printed circuit board and receive one end portion of one converter therein.

The power connection means preferably comprises at least one power supply and a plurality of circuit breakers mounted in the housing and electrically coupled to the traces on the printed circuit board. One circuit breaker connector is connected by one conductive trace on the printed circuit board to one power conductor. Another circuit breaker is connected between the at least one power supply and one conductive trace on the printed circuit board.

According to another aspect of the present invention, the at least one power supply is mounted on the printed circuit board which is fixedly supported in the housing. A heat sink is coupled to the one power supply and is disposed in heat transfer communication with one wall of the housing.

In another aspect of the invention, an auxiliary housing is provided with a rack support bracket for receiving a rack mountable electrical device. According to this aspect, the auxiliary housing is fixedly joined to the main housing and has an aperture disposed in communication with at least one aperture in one wall of the main housing for the passage of electrical conductors between the main housing and the auxiliary housing.

Also according to this aspect, a DC to AC converter circuit is mounted in the auxiliary housing. A conductor passes from the main housing to the auxiliary housing for connecting DC input power to the DC to AC converter. An output of the converter providing AC power in the auxiliary housing and may optionally be connected to a convention outlet mounted in the auxiliary housing.

According to another aspect of the invention, a barrier is mounted within the housing and divides the housing into two separate compartments. Separate doors are pivotally mounted on the housing to provide separate access to the compartments within the housing.

The communications cabinet of the present invention provides many advantages over previously devised communication cabinets providing interconnections between copper conductors, fiberoptic conductors and copper/fiber converters. According to one unique aspect of the invention, a printed circuit board carrying conductive traces provides prewired connections between plug-in circuit breakers, plug-in converters and electrical conductors passing through apertures in the housing. This eliminates a substantial portion of the separate wires previously employed in similar communication cabinets between the circuit breakers, converters and external conductors.

Further, the unique sealable access means provides a sealed entrance of electrical conductors or cables through apertures in the housing while at the same time enabling the connectors at the end of the cable or conductors to be completely disposed within the housing thereby protecting the connectors from external damage as frequently occurs with previously devices communication cabinets having the cable and conductor terminating connectors mounted on the exterior of the housing.

The provision of the add-on auxiliary housing also provides unique advantages insofar as enabling rack mounted devices, such as hubs, routers or data switches to be coupled to the power conductors in the main housing. A DC to AC inverter mounted in the housing or auxiliary housing enables 110/120 VAC power to be provided in the auxiliary housing for the rack mounted devices without requiring a separate 110/120 volt AC input conductor having to be run to the communications cabinet.

BRIEF DESCRIPTION OF THE DRAWING

The various features, advantages and other uses of the present invention will become more apparent by referring to the following detailed description and drawing in which.

Figure 1:
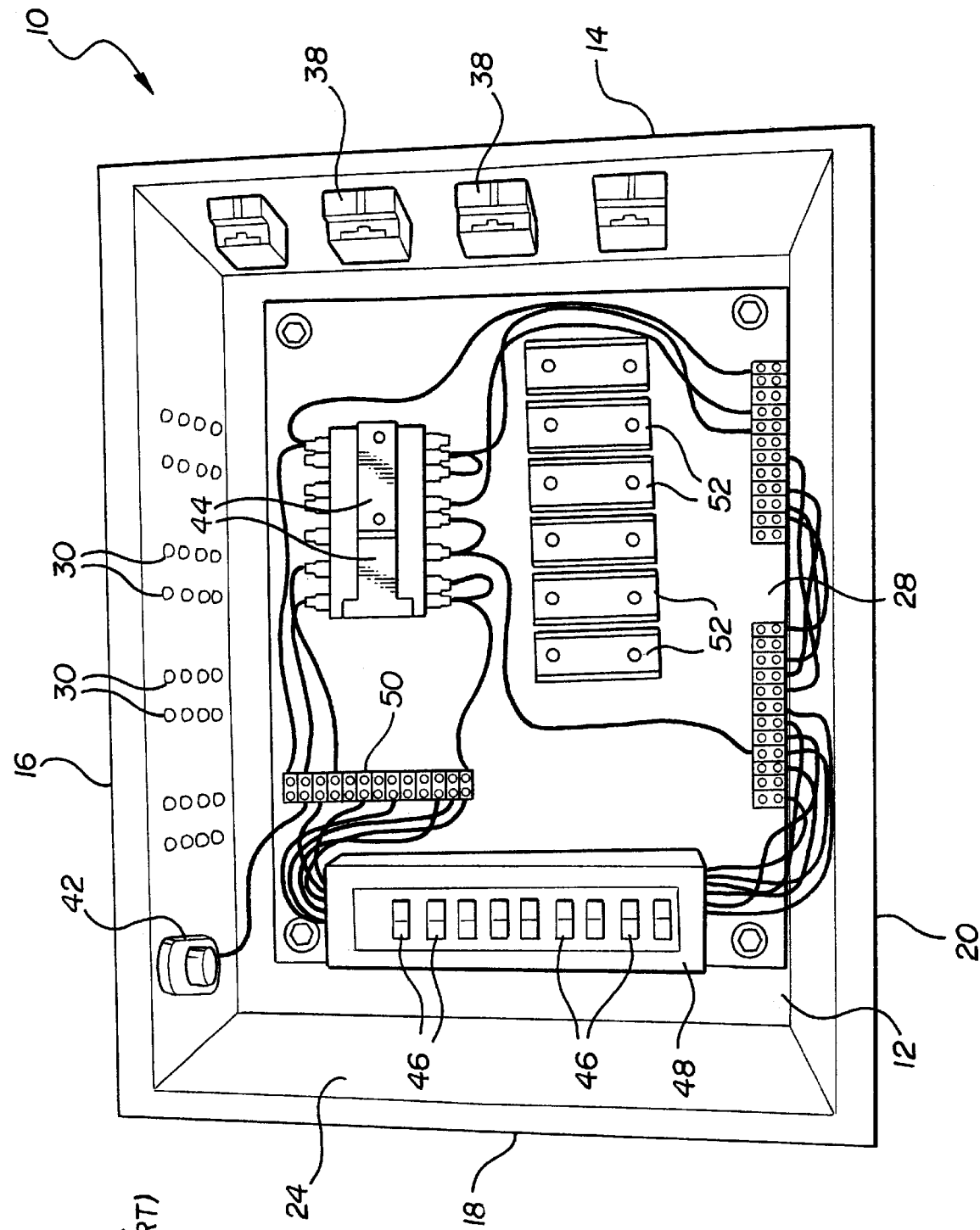
FIG. 1 is a plan view of a prior art communications, cabinet.
Figure 3:
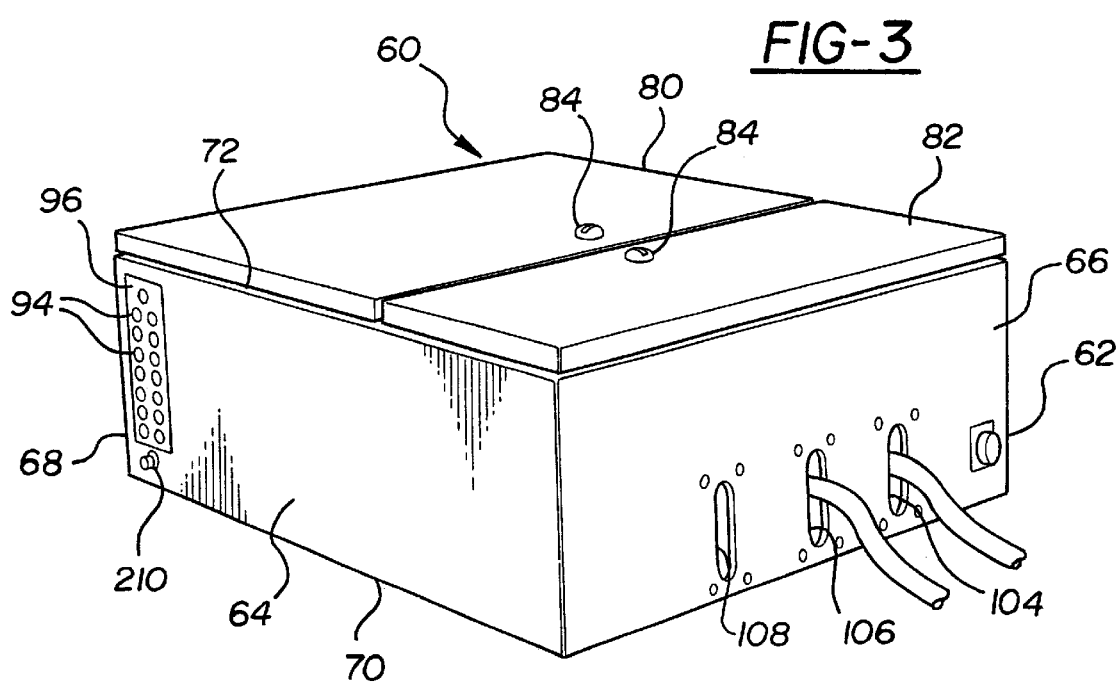
Figure 4:
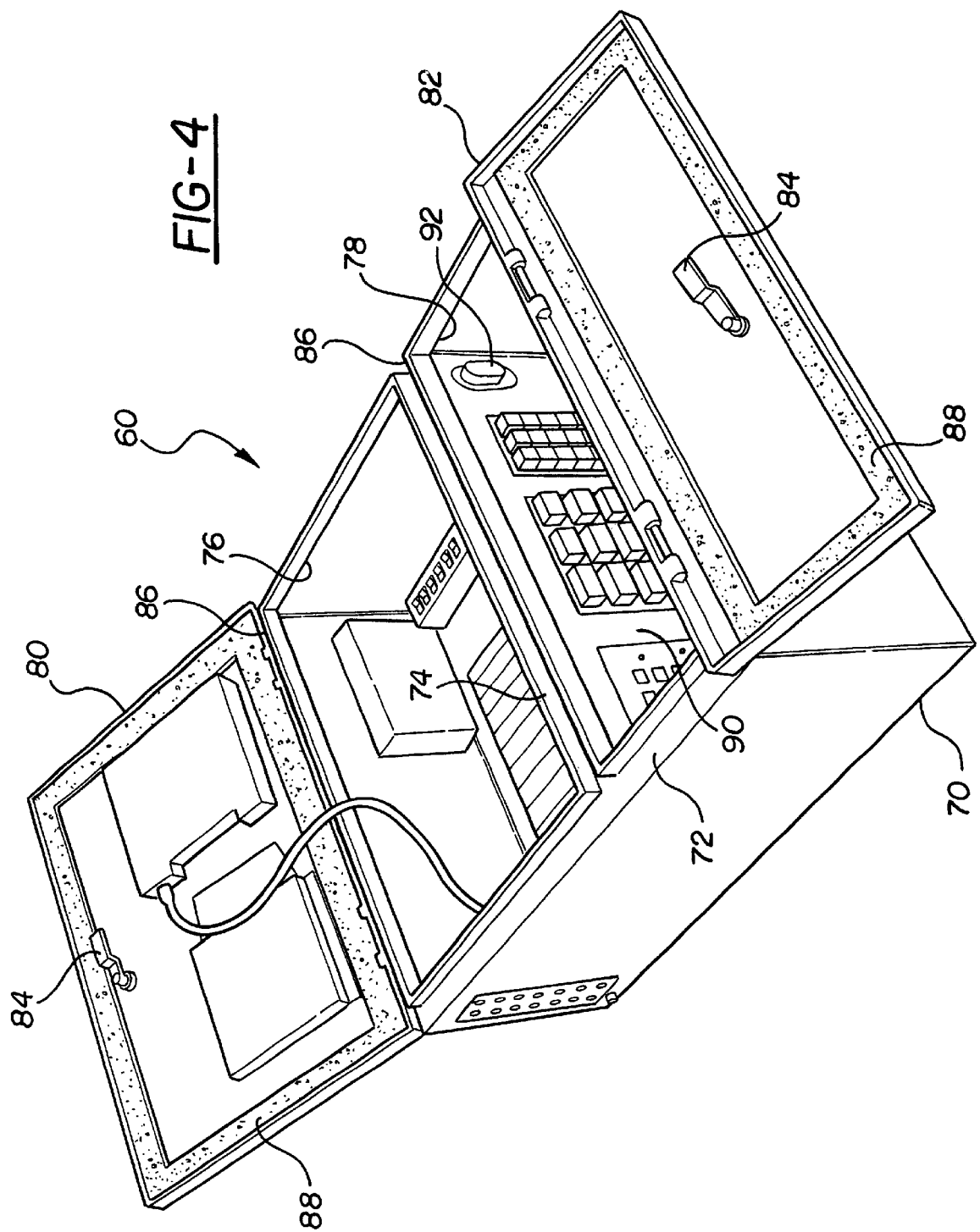
Figure 6:
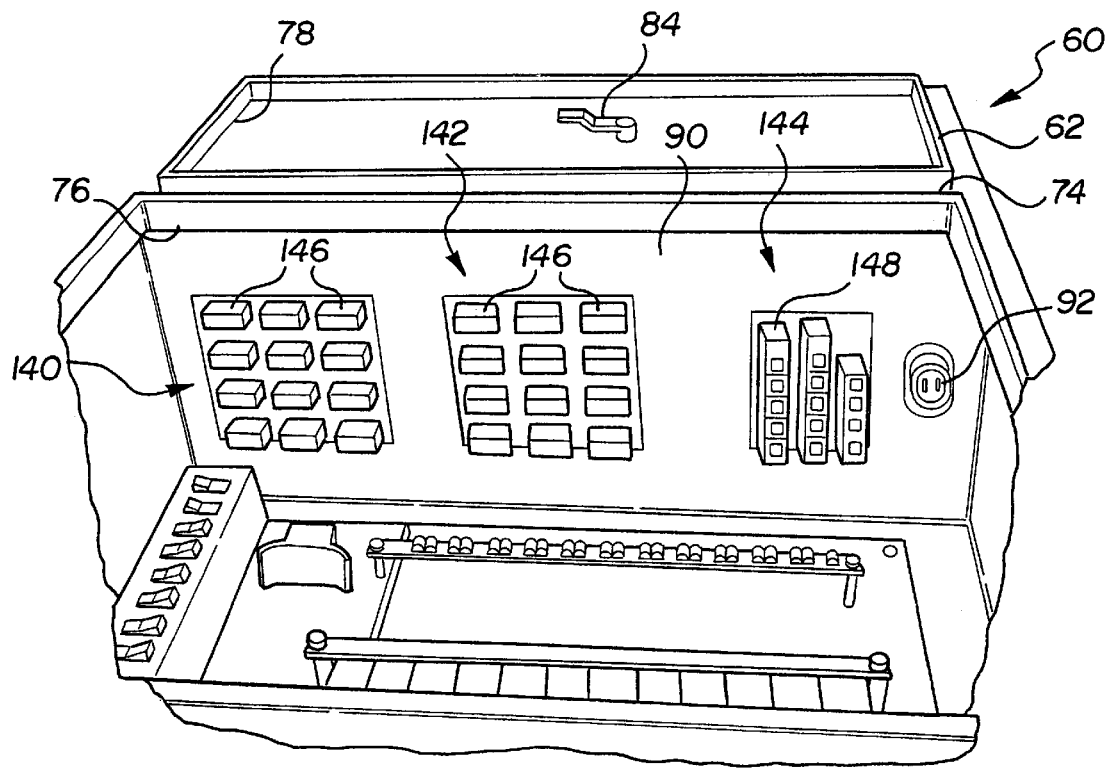
Figure 9:
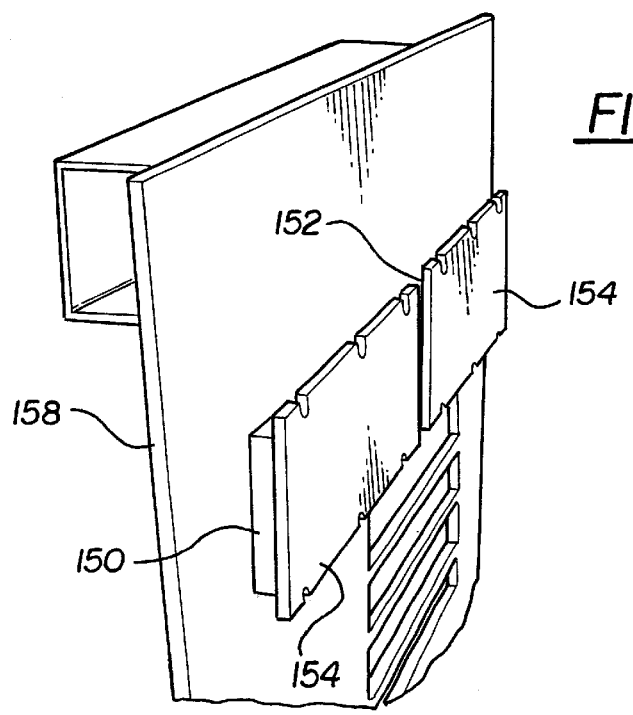
Figure 7:
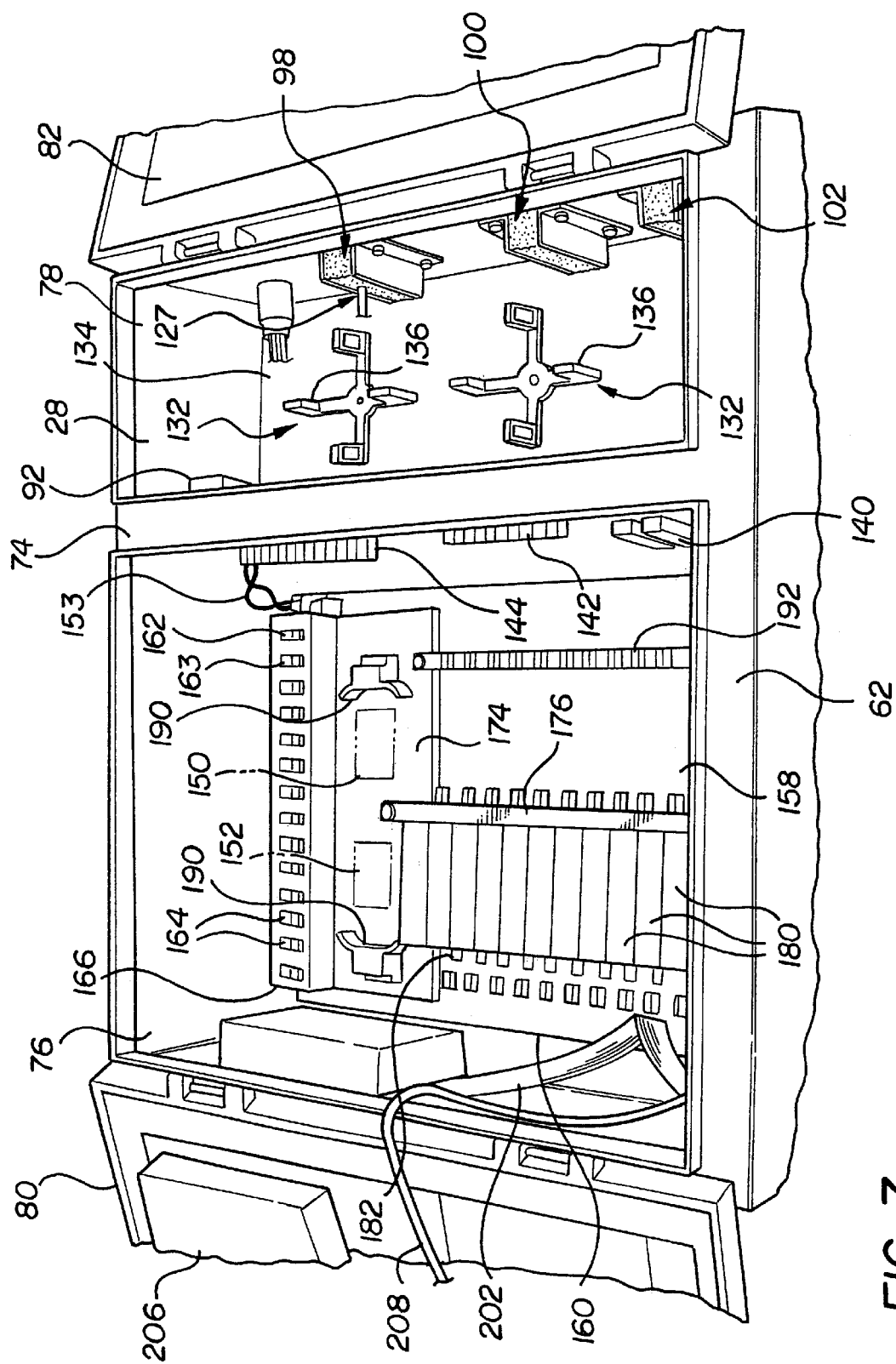
Figure 8:
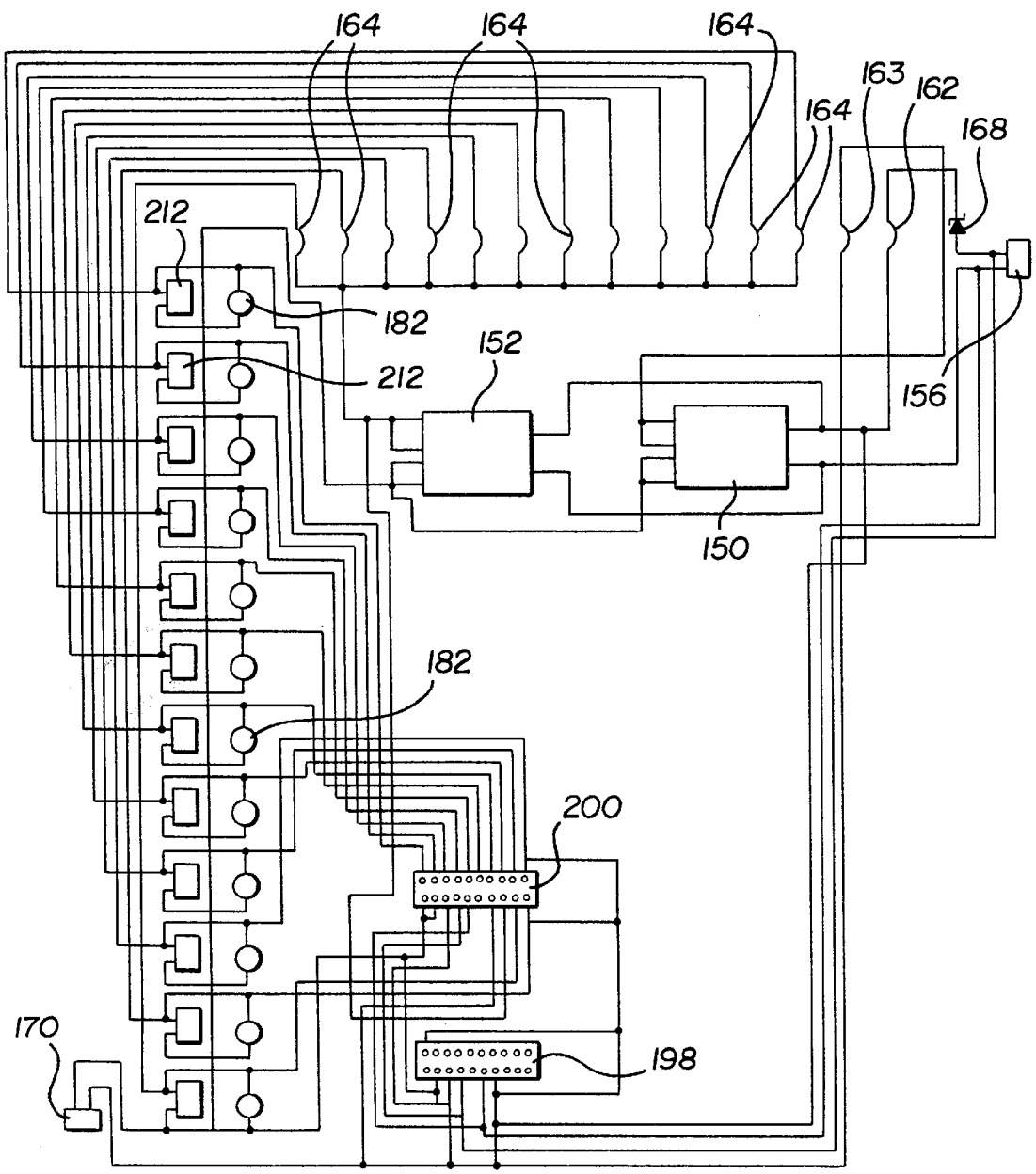
Figure 10:
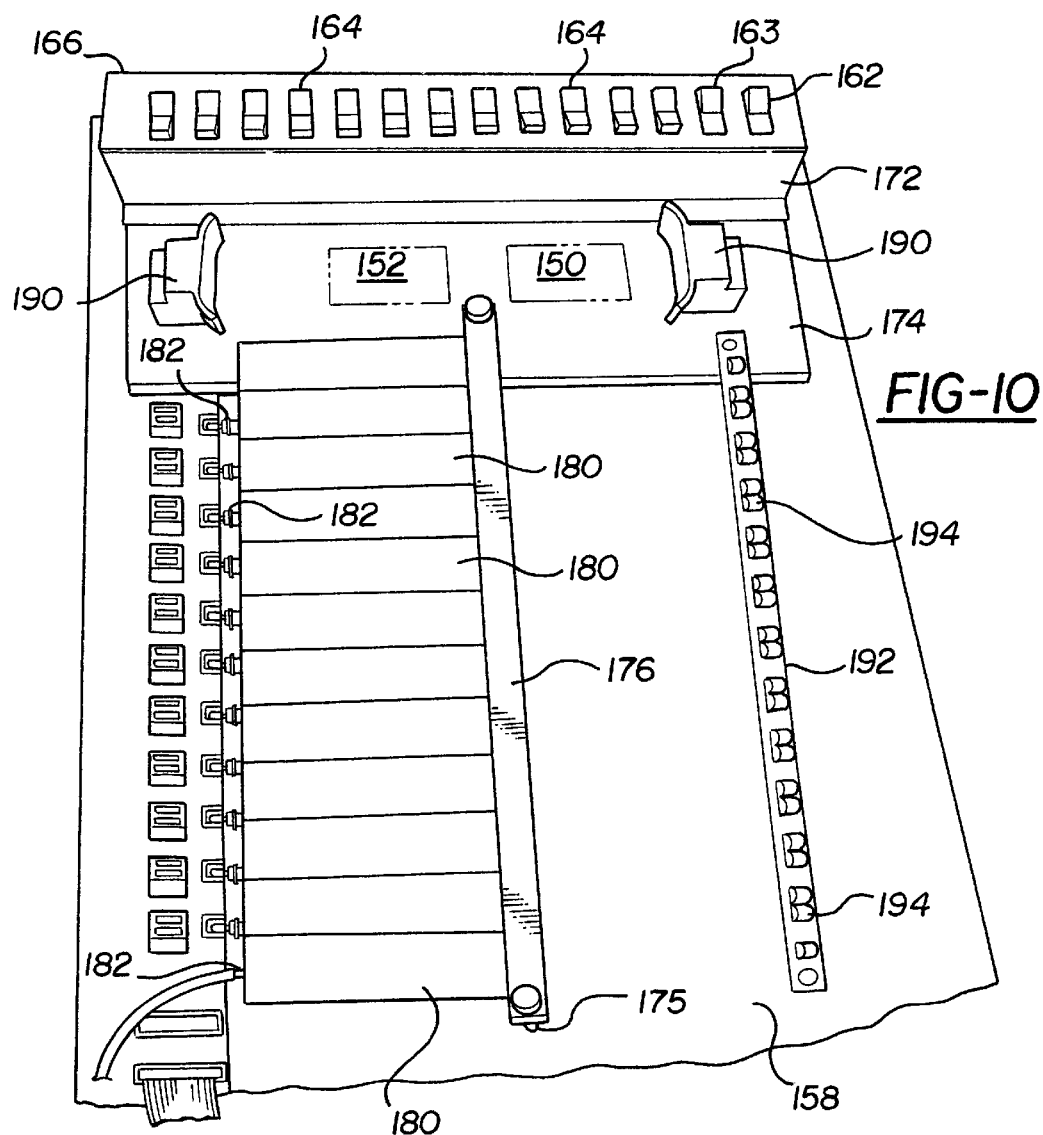
Figure 11:
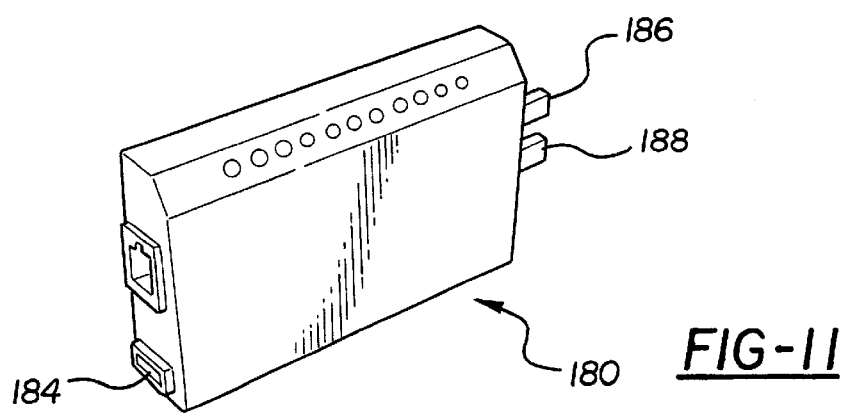
Figure 12:
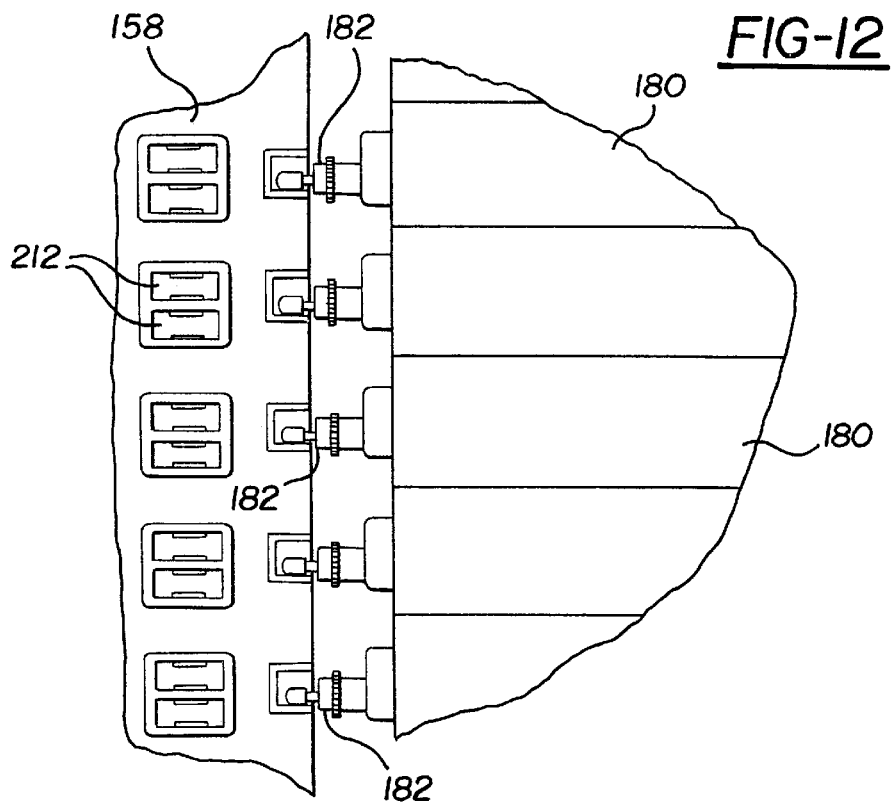
Figure 13:
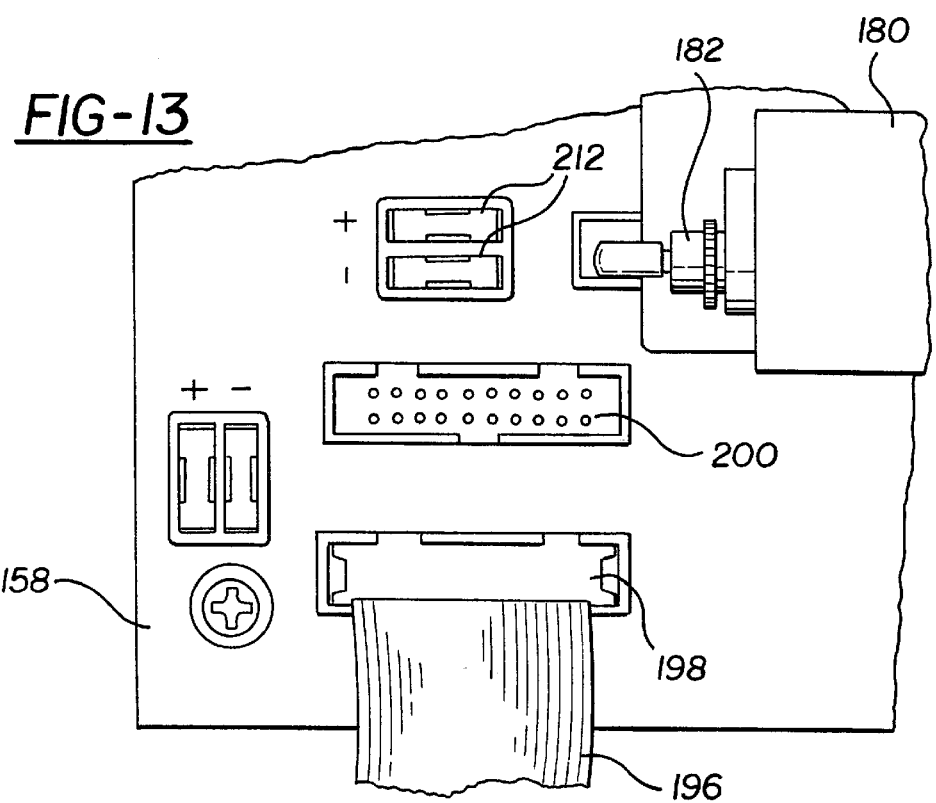

FIG. perspective view of the prior art communication cabinet shown in FIG. 1;

FIG. 3 is a perspective view of a communications cabinet according to the present invention with the doors in a closed position;

FIG. 4 is a front perspective view of the interior of the communications cabinet shown in FIG. 3;

FIGS. 5A and 5B are perspective views of the cable seal means of the present invention depicted in open and sealing positions, respectively;

FIGS. 5C and 5D are prespective views of alternate aspects of clips employed with the cable sealing means shown in FIGS. 5A and 5B;

FIG 6 is a perspective view of the interior barrier with fiberoptic and copper connects;

FIG. 7 is a front perspective view of the interior of the cabinet;

FIG. 8 is a schematic diagram of the component wiring in the cabinet;

FIG. 9 is perspective view of the printed circuit board showing the mounting of the power supply;

FIG. 10 is a partial perspective view showing the circuit breakers and converters;

FIG. 11 is a perspective view of a copper/fiber converter;

FIG. 12 is a partially enlarged perspective view depicting the mounting of the converters in plugs on the printed circuit board;

FIG. 13 is a partial plan view of the printed circuit board showing the ribbon connectors; and FIG. 14 is a partially broken away, front elevational view showing an optional, auxiliary extention cabinet according to the present invention.

DESCRIPTION OF THE PREFERRED EMBODIMENTS

Referring now to FIGS. 3–13, there is depicted preferred aspects of a multi-purpose communication cabinet or enclosure 60 of the present invention.

The cabinet 60 is a standard NEMA cabinet having a top wall 62, a bottom wall 64, opposed side walls 66 and 68, a back wall 70 and a front wall 72 generally in the form of a peripheral flange extending perpendicularly to the top wall 62, the bottom wall 64 and the side walls 66 and 68. The front wall 72 also includes an intermediate flange 74 which forms a large aperture 76 and a smaller aperture 78 in the front wall 72 opening to the interior of the cabinet 60.

A pair of hinged doors 80 and 82, each with locks 84, are hingedly attached to the front wall 72 on opposite sides of the cabinet 60 for pivotally closing the apertures 76 and 78 in the front wall 72.

A raised flange 86 surrounds each aperture 76 and 78 and extends generally perpendicular to the front wall 72. The flange 86 is engagable with a seal 88 mounted on the interior surface of each door 80 and 82 for sealingly closing the apertures 76 and 78 when the doors 80 and 82 are in the closed position.

As shown in FIGS. 4, 6 and 7, a barrier or divider 90 is mounted internally within the cabinet 60 and extends between the top wall 62 and the bottom wall 64. The barrier is spaced a short distance from the side wall 66 to divide the interior of the cabinet 60 into two separate compartments, each individually accessible through the apertures 76 and 78, respectively, in the front wall 72 and the doors 80 and 82.

External elements are provided on the cabinet 60 for the passage of conductors into or out of the cabinet 60 as well as providing a mounting surface for indicators to monitor the status of various components within the cabinet 60.

A plurality of indicators 94, such as LEDs, are mounted on a printed circuit board attached to a mounting plate 96 affixed to the bottom wall 64 of the cabinet 60 or mounted directly to the bottom wall 64. As described hereafter, the indicators or LEDs 94 are connected to various components in the cabinet 60 and provide an indication of the operative status of such components.

As shown in FIG. 3, and in greater detail in FIGS. 5A and 5B, sealable access means are provided in the cabinet 60, preferably along the side wall 66 for sealably controlling access to the interior of the cabinet 60, and more specifically, to the smaller internal compartment formed between the barrier 90 and the side wall 66. By way of example only, three sealable access means 98, 100, and 102 are provided in the cabinet 60 and respectively alignable with apertures 104, 106 and 108 formed in the side wall 66 of the cabinet 60. Preferably, the apertures 104, 106 and 108 are in the form of elongated slots having rounded or square ends, by example only.

As the sealable access means 98, 100 and 102 are substantially identically constructed, the following detailed description of the sealable access means 98, shown in FIGS. 5A and 5B, will be understood to apply equally to the other access means 100 and 102. As shown in FIGS. 5A and 5B, the sealable access means 98 includes first and second angle brackets 110 and 112, each having a first leg 114 adjustably mountable on the side wall 66 of the cabinet 60 by means of a nut and bolt extending through the side wall 66 and a slot 118 in the first leg 114. As shown in FIGS. 5A and 5B, a pair of slots 118 are spaced at opposite ends of the first leg 114, with each slot 118 receiving a fastener 120. Each angle bracket 110 and 112 also includes a second leg 116 which extends generally perpendicularly from one edge of the first leg 114. A seal member, such as a neoprene gland 122 and 124, is mounted on each second leg 116, by an adhesive, for example. Each gland 122 and 124 may be formed of a single resilient seal member or a pair of seal members, as shown in FIGS. 5A and 5B, which are adhesively joined together to form a single gland on each second leg 116.

As shown in FIG. 5B, the glands 122 and 124 are resilient enough to compress and sealingly close about the outer sheath 126 of a multi-conductor cable 127, such as a multi-conductor fiber optic cable 127, described in greater detail hereafter. When a single cable 127 is inserted between the glands 122 and 124 which are initially spaced apart in an open position as shown in FIG. 5A, and then urged toward each other until the glands 122 and 124 engage and are fixed in place by the fasteners 120, as shown in FIG. 5B, the glands 122 and 124 form a sealing closed surface about substantially the entire exterior surface of the sheath 126 of the cable 127.

Figure 2:
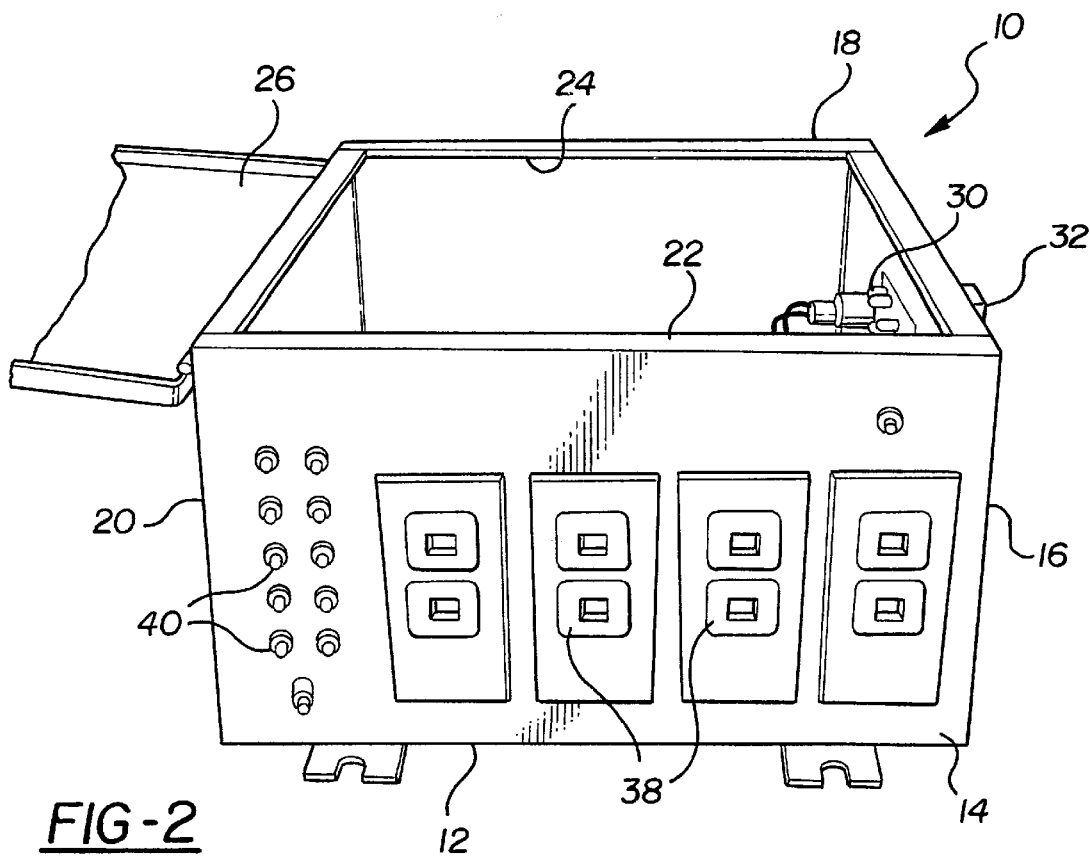

Besides providing a sealing function, the glands 122 and 124 also provide a strain relief function since the outer sheath 126 of the multiconductor cable 127 can be fully inserted through the engaged glands 122 and 124 and then removed from the ends of the conductors 128 in the cable 127 only on the portion of the conductors 128 disposed within the interior of the cabinet 60. This eliminates the need for external connectors, such as the external fiberoptic connectors or jacks 30 shown in FIGS. 1 and 2.

FIGS. 5C and 5D depict clips which can be mounted over the glands 122 and 124 when the glands are in the closed position to forcibly hold the glands 122 and 124 together tightly about the cable 127 extending therethrough. In one aspect of the invention, an elongated clip 220 is formed with a central end wall 222 and a pair of opposed side walls 224. The spacing between the side walls 224 as well as the height or extension of each side wall 224 from the central end wall 222 is selected to enable the clip 220 to be tightly mounted over the glands 122 and 124 and the adjacent legs 116 of the angle brackets 110 and 112 when the glands 122 and 124 are in the closed position shown in FIG. 5C. The clip 220 thus functions to forcibly hold the glands 122 and 124 together about the multiconductor cable 127 extending through the glands 122 and 124.

An elongated aperture 226, preferably in the form of an elongated slot, is formed in the central end wall 222 and provides a passage for the cable 127. The aperture 226 and the surrounding portions of the central end wall 222 of the clip 220 serve as a strain relief for the cable 127. It will be understood that the single elongated slot 226 may be replaced by two or more smaller length slots or circular apertures, each receiving a separate cable 127 extending through the engaged glands 122 and 124.

FIG. 5D depicts an alternate aspect of a clip 230 in which a shorter length clip 230 is formed with a central end wall 232 and a pair of opposed side walls 234. The clip 230 is preferably designed for use in a set if two or more clips 230 mounted at opposite ends or along the length of the joined glands 122 and 124 and the legs 116 of the angle brackets 110 and 112 to tightly hold the glands 122 and 124 together.

Referring now to FIG. 7, a wire wheel 132 is optionally provided for each multiconductor cable 127. Each wire wheel 132 is of conventional construction and includes a central base which is fixedly mounted on a back plate 134 spaced by means of standoffs or studs mounted on the back wall 70 of the cabinet 60. Each wire wheel 132 includes a plurality of circumferentially spaced wire clips 136 which enable the conductors 128 from each multiconductor cable 127 to be wound in a circular arrangement about one wire wheel 132 to provide strain relief and wire management within the cabinet 60.

It should be understood that although a wire wheel 132 is preferred for each cable 127 mounted through one of the access controlling means 98, 100 and 102, it is also possible, within the scope of the present invention, to eliminate the wire wheel 132 for any or all of the multiconductor cables 127.

As shown in FIGS. 4, 6, and 7, 48 VDC receptacle 92 is mounted in the barrier 90. The receptacle provides a connection for a plug, not shown, at one end of a cable carrying 48 VDC power which passes through one of the sealable access means 98, 100 or 102. A separate cable and plug may be mounted on the opposite end of the receptacle 92 in the larger compartment and connected to one of the circuit breakers 162 or wired directly, without a plug to the circuit breaker 162.

As also shown in FIGS. 4, 6 and 7, a plurality of groups or sets 140, 142 and 144 of individual connectors are mounted on the barrier 90 to provide communication between the two interior compartments within the cabinet 60. The connectors of each group 140, 142 and 144 may be of any conventional fiberoptic or copper wire connector and may be provided in any number, combination, etc. within each group. Thus, by way of example only, the first and second groups 140 and 142 of connectors are fiberoptic connectors, such as standard "ST" or "SC" connectors 146. The connectors 146, as is conventional, are available in multiples of three on a removable plate which is secured by means of fasteners to the barrier 90 on opposite sides of an aperture formed in the barrier 90 for receiving the group of connectors 140 or 142 therethrough. Since it is conceivable that a fiber converter with one type of connector will have to be joined to an external cable terminated with a different type of connector, the six-pack fiber adapter panels are available in different connector configurations, such as duplex, feed-through connectors of a "ST" to "ST", "ST" to "SC", or "SC" to "SC" configuration. In use, each conductor 128 in each multiple conductor cable 127 is terminated with a suitable fiber "SC" or "ST" connector and plugged in to one of the connectors 146. Another "SC" or "ST" connector, attached to a separate fiberoptic conductor will be connected to the opposed connector of each feed through connector 146 to provide connection to an individual fiber/copper converter, as described hereafter.

The third group 144 of connectors, in the present embodiment, is in the form a standard RJ45, category 5 jack mounted in a suitable receptacle attached to a plate affixed to the barrier 90 as shown in FIG. 6. For example, a standard wall plate could be installed in the barrier 90 and designed to accept either a Keystone-style feed-through coupler or a Keystone-style outlet jack. Both the coupler or jack 148 receive a port-terminated connection from individual copper wires extending to each copper/fiberoptic converter, as described hereafter.

Referring now to FIG. 9, there is depicted D.C. converters or power supplies 150 and 152, respectively, which are connected to the 48 VC receptacle 92 and convert the incoming 48 VDC power to 24 VCC and 12 VDC power to power a radio and the copper/fiber converters, as described hereafter. Each power supply 150 and 152 also drives certain LEDs 94 to indicate the presence of 48 volt power from the 48 VDC receptacle 92 as well as a power on condition through a first circuit breaker as also described hereafter.

Each power supply 150 and 152 is mounted on a heat sink surface 154, such as an aluminum plate 154. A heat sensitive adhesive is applied to the exterior surface of the plate 154 for bonding and mounting the plate 154 to the back wall 70 of the cabinet 60. This mounting arrangement makes the back wall 70 of the cabinet 60 function as a heat sink to dissipate heat from the power supplies 150 and 152.

Each of the power supplies 150 and 152 has external leads, not shown, which are soldered or otherwise electrically connected to an input power terminal or pad 156, shown in FIG. 8, on a printed circuit board 158 shown in FIGS. 7, 9 and 10. Soldered wires 153 extend from the 48 VDC receptacle 92 and the input power terminal or pad 156. Also not shown is a resilient support, such as a neoprene mounting pad, which is disposed beneath an aperture 160 in the printed circuit board 158 for supporting the copper/fiber converters on the back wall of the cabinet 60.

A circuit diagram of the electrical wiring between the various components mounted in the communications cabinet 60 is shown in FIG. 8. As shown therein, substantially all of the wiring is in the form of conductive traces formed in the surface of the printed circuit board 158. Each conductive trace extends between terminal pads on the printed circuit board 158 which provide an electrical connection point to various electrical components, such as the power supplies 152 and 158, the input power terminal 156 and other components described hereafter.

As shown in FIGS. 6, 7, 8 and 10, a plurality of circuit breakers 162, 163 and 164 are mounted in a bracket 166. The circuit breakers 162, 163 and 164 are, for example, single pole, series trip, magnetic-type DC circuit breakers which have a substantially instantaneous response. Preferably, the circuit breakers 162, 163 and 164 are panel mountable, rocker switch-type breakers with tab terminations. The circuit breaker 162 is the main circuit breaker for the electrical components mounted within the cabinet 60 and is connected between the input power terminal 156 and the power supplies 150 and 152. A reverse polarity protection diode 168 is connected in series between the circuit breaker 162 and one lead of the power terminal 156.

The circuit breaker 163 is connected between the output of the power supply 150 and the 24 VDC radio power terminal 170, shown in FIG. 8. A plurality of the circuit breakers 164 are mounted in the bracket 166 and are each connected to one individual copper/fiber converter 180.

The tab terminations of the circuit breakers 162, 163 and 164 are mounted in a pair of tubular fast-on connectors which are soldered or otherwise mounted on the printed circuit board 158 so as to receive each circuit breaker 162, 163 and 164 in a snap-in mount.

The bracket 166 is formed with a raised end portion 172 having a lower lip which includes apertures for receiving fasteners to mount one end of the bracket 166 to the printed circuit board 158. An elongated aperture is formed in the upper wall of the raised end 172 for allowing access to the rocker switch on each circuit breaker 162, 162 and 164.

An opposite end of the mounting bracket 166 projects outwardly from the lower edge of the raised end 172 to an end which is mounted by means of fasteners to the printed circuit board 158.

A stud with a threaded bore is mounted on the lower end portion 174 of the mounting bracket 166 by means of a fastener 175 extending through the lower end portion 174. The stud is alignable with an aperture in one end of a mounting strap 176 which extends to an opposite end also alignable with a threaded stud mounted on the printed circuit board 158. The strap 176 is used to releasibly secure the copper-fiber converters 180 in position relative to the printed circuit board 158.

As shown in FIGS. 8, 10 and 12, barrel plugs 182 labeled J2, J4, . . . J24 in the circuit diagram of FIG. 8, are soldered or otherwise mounted on the printed circuit board 158 adjacent to one edge of the aperture 160. The end portion of each barrel plug 182 extends into the aperture 160 and is releasibly engagable with a mating receptacle in the copper-fiber converters 180 to both mount one end of the converters 180 on the printed circuit board 158 as well as providing a 12 VDC power supply to each converter 180.

Each copper/fiber converter 180 is designed to provide a connection and electrical communication between copper electrical conductors and a fiberoptic conductors. By way of example, a typical converter 180 which may be employed in the cabinet 60 is a 10 base T-FL Converter, Model No. N-10 TFL twisted pair/fiber converter sold by Netrix Technologies, Inc., Livonia, Mich. This converter 180 has a plurality of LED status indicators for installation and trouble shooting purposes. A standard RJ45 jack 184 provides a connection to a mating plug attached to the end of a copper wire conductor. A pair of outwardly extending terminals 186 and 188 provide electrical connection to and electrical communication to fiberoptic conductors having suitable end terminations or plugs and which are connected to the group of connectors 140 and 142 mounted on the barrier 90.

Although not shown in the drawings, individual fiberoptic conductors 128 having suitable "ST" or "SC" end connections mounted in one of the connectors in the group of connectors 140 and 142 on the barrier 90 are wound around a wire spooler in the form of a pair of spaced, arcuate wire guides 190 mounted by means of adhesive or suitable fasteners to the lower end portion 174 of the circuit breaker mounting bracket 166. Each fiberoptic conductor 128 extends from the wire guide 190 to a wire guide strip 192 which is mounted by means of a threaded studs and fasteners to the lower end portion 174 of the bracket 166 and the printed circuit board 158. Individual wire clips 194 are mounted on the wire guide 192 and receive individual fiberoptic conductors 128 which are then connected to one of the terminals 186 or 188 on a converter 180.

Although not shown in the drawings, a similar wire spooler formed of a pair of spaced wire guide arms 190 may be mounted on a lower portion of the printed circuit board 158 for winding the plurality of copper electrical conductors extending from the connectors 148 in the third group of connectors 144 on the barrier 90 and suitable plug terminations connected to a jack 184 on a converter 180.

Referring again to FIGS. 3, 8 and 13, the LEDs 94 are mounted on a small printed circuit board, not shown, having a ribbon connector connected by a ribbon cable 196 to a similar ribbon connector 198 mounted on the printed circuit board 158. Individual conductive traces on the printed circuit board 158 are connected to various terminal pins of the ribbon connector 198 to connect each LED 94 to various portions of the circuit to provide status and monitoring information for various components of the circuit. For example, one LED 40, such as a blue LED, is connected to the main 48 VDC input power terminal 156 to provide an indication of 48 volts "in" condition. Another LED 40, such as a green LED, is connected to the output of the circuit breaker 162 to indicate a power "on" condition within the cabinet 60.

A yellow LED 40, for example, is connected to the output of the 24 VDC power supply 150 to provide an indication of the presence of 24 VDC. The remaining LEDs 40, which may be red LEDs, provide an indication of 12 VDC through each circuit breaker 164 to the copper/fiber converter 180.

FIG. 13 also shows a second ribbon connector 200 mounted on the printed circuit board 158. As shown in FIGS. 6, 4, a ribbon cable 202 having a suitable plug is connected at one end to the connector 200 and at an opposite end to a similar connector which is mounted in a data acquisition unit (DAU) 204. The data acquisition unit 204 which can be mounted in any suitable location within the interior of the cabinet 60, and provides an interface to provide status to an exterior LAN for network administration. Various parts of the circuit within the cabinet 60 or a component connected to the connector 200 by the conductive traces on the printed circuit board 158 may be output to the DAU 204 for transmission to an external control to monitor the status of components within the cabinet 60 and/or systems controlled by the circuitry and components within the cabinet 60.

As shown in FIG. 4, a radio or wireless transmitter 206 is mounted on the inside surface, by example only, of the large door 80. The radio 206 is connected by a cable 208 to a plug 210 mounted on the LED mounting plate. An antenna may be connected to the connector 210 (see FIG. 3) so as to be able to transmit and receive information from external scanners.

FIG. 12 depicts an optional terminal connection for connecting 12 VDC power from the circuit breaker 164 to different type of copper/fiber converters. In this embodiment, a two-terminal pair 212 is mounted on the printed circuit board 158 adjacent to the barrel plugs 182. The terminal pair 212 comprises conventional terminals for receiving a pair of wires, not shown, one of which terminates in a plug connectable to a mating receptacle in a different style fiber/copper converter mountable in clips affixed to a plate extending over the aperture 160 in the printed circuit board 158 and wires extending to the LEDs 40. In use, the individual converters are removed and a plate, not shown, is affixed to the printed circuit board 158 by threaded studs mounted on the circuit breaker housing 166 and a bottom portion of the printed circuit board 158. Individual U-shaped spring clips are mounted on the plate for receiving individual converters.

Several optional aspects of the present invention are also shown in FIG. 14. An auxiliary, optional, extension cabinet or enclosure 250 is depicted mounted adjacent to the bottom wall 70 of the cabinet 60. For clarity, only portions of the bottom wall 70 of the cabinet 60 are depicted in FIG. 14.

According to this aspect of the present invention, the extension cabinet 250 is formed with four peripheral side walls, three side walls 252 of which are closed or solid, and a fourth wall 254 which defines an opening to the interior of the extension cabinet 250. A door 256 is hinged to the extension cabinet 250 and pivotally covers the open side wall 254. The extension cabinet 250 also includes a rear wall 258 and an opposed front peripheral flange 260 extending about the entire periphery of the extension cabinet 250 and disposed adjacent to the bottom wall 70 of the cabinet 60.

A plurality of mounting tabs 262 are removably attachable to the rear wall 258 of the extension cabinet 250 by means of fasteners which extend through aligned apertures in each tab 262 and in a corner of the rear wall 258 of the extension cabinet 250. Each tab 262 includes another aperture which can receive a fastener for securing the extension cabinet 250 to a support.

It will be understood that the mounting tabs 262 are also usable with the communications cabinet 60 when the communications cabinet 60 is mounted to a support without the extension cabinet 250. The mounting tabs 262 are removably attachable to the bottom wall 70 of the communications cabinet 60 in the same manner as described above by means of fasteners. In this manner, the same mounting tabs 262 used to mount the communications cabinet 60 to a support may also be used to mount the communications cabinet 60 and the extension cabinet 250 to the same support when the extension cabinet 250 is added to a previously mounted communications cabinet 60.

The extension cabinet 250 is fixedly joined to the communications cabinet 60 by means of fasteners, such as nuts and bolts, extending through the aligned apertures in the corners of the bottom wall 70 of the cabinet 60 and corresponding apertures formed at the peripheral corners of the flange 260 on the extension cabinet 250.

Communication for the passage of cables or electrical conductors between the extension cabinet 250 and the communications cabinet 60 is provided by a large aperture 264 which is surrounded by the peripheral flange 260 in the extension cabinet 250. This aperture 264 which opens to the interior of the extension cabinet 250 communicates with a plurality of smaller apertures 266 formed along one side edge of the bottom wall 70 of the communications cabinet 60.

A separate aperture 268 located at the opposite end of the bottom wall 70 of the cabinet 60 also provides communication to the interior of the extension cabinet 250. This aperture 268 is used, according to one aspect of the present invention, for the passage of a cable carrying 48 VDC power from the smaller compartment in the cabinet 60 to the extension cabinet 250.

As noted above, a input cable carrying 48 VDC passes through one of the sealable glands 98, 100 or 102 and is connected internally within the cabinet 60 to the receptacle 92. A separate plug and conductor is connected to the opposite end of the receptacle 92 in the large compartment in the cabinet 60 to provide power to the power supplies 150 and 152. Optionally, a separate connection can be provided to another plug receptacle mounted on the barrier 90 for returning 48 VDC power to the smaller compartment in the cabinet 60. A cable plugged into the optional receptacle can then pass through the aperture 268 in the bottom wall 70 in the cabinet 60 into the interior of the extension cabinet 250.

AC power is provided in the cabinet 250 by a DC to AC converter, such as an inverter 246 which is mounted on the rear wall 258 of the cabinet 250. The inverter 246 may be any suitable inverter which is capable of converting 48 VDC to 110/120 VAC. By example only, the inverter 246 is a modified sine inverter. In addition to supplying 110 VAC power directly to the rack mounted units, AC power is also supplied to a duplex receptacle 248 also mounted on the rear wall 258 of the cabinet 250. Any of the rack mounted units mounted in the extension cabinet 250 can be directly plugged into the outlet 248.

A pair of mounting rack brackets 270, generally in the form of 90° angle irons, have one leg fixedly secured, such as by welding for example, to an inside surface of one of the side walls 252 of the extension cabinet 250. The other leg of each bracket 270 projects perpendicularly from the side wall 252 and carries a plurality of spaced apertures 272.

The mounting brackets 270 and the apertures 272 provide a mounting surface for a flange on a rack mountable unit or device 274, such as a network switch, hub, etc. Such a device 274 can be inserted through the open end 254 of the extension cabinet 250, after the door 256 has been pivoted to the open position, and then securely attached to the mounting brackets 270. A conventional plug attached to such a rack mounted device 274 can be plugged into the duplex outlet 248 to receive 110 VAC power from the inverter 246.

The inverter 246 provides several advantages to the communications cabinet 60 of the invention. First, only low voltage DC power is supplied to the cabinet 60 thereby eliminating a separate feed for an incoming 110 VAC line. This cleans up the power cable distribution and enables the low voltage DC power conductor or cable to be merely disposed in an open cable tray with other conductors and not in a separate conduit as is required by NEC standards.

Although the provision of the rack mounting bracket 270, the duplex outlet 248 and the DC to AC converter 246, have been described as being mounted in the separate auxiliary housing 240 mountable to and disposed in conductor communication with the main housing 60, it will be understood that the main housing or cabinet 60 could be simply made larger for mounting of the rack mounting bracket 270, the converter 246, and the duplex outlet 248 in a single larger housing 60. However, the use of an auxiliary housing for the rack mounted devices, converter and duplex outlet is preferred as the rack mounted devices may be provided after assembly and installation of a standard sized communications cabinet 60.

Although all of the features or aspects of the present communications cabinet 60, including, but not limited to, the two compartment housing or cabinet 60, the sealable access means in the cabinet 60 for receiving copper, fiberoptic and power conductors or cables, the preprinted circuit board 158 providing prewired connections between the connector patch field and individual circuit breakers 164, LEDs, etc., are described as being provided in the cabinet 60, it will be understood that each of these features may be used separately or in various combinations as part of the present invention. Thus, the present invention will be understood to include each described aspect or feature as a separate aspect of the invention as well as in combination with one or more other features.

In summary, there has been disclosed a unique communications cabinet which simplifies the construction and wiring of interconnections between copper conductors and fiberoptic conductors, circuit breakers and indicator devices. The communication cabinet of the present invention also includes an on-board inverter for generating 110 VAC power from an incoming 48 DC line to simplify power cable distribution to the communication cabinet.

What is claimed is:

1. A communications cabinet providing connections between fiberoptic conductors and copper conductors and copper/fiber converters, the communications cabinet comprising:

a housing having walls, one wall having at least one aperture;

the copper/fiberoptic converters mounted in the housing; and sealable access members, mounted on the housing adjacent to the one aperture and movable relative to each other between a first spaced-apart position allowing passage of at least one of fiberoptic conductors and copper conductors through the one aperture in the wall of the housing, and a second closed position when the sealable access members sealingly enclose the passage at least one of the fiberoptic conductors and the copper conductors through the one aperture in the wall of the housing.

2. The communications cabinet of claim 1 further comprising:

a clip mountable over the sealable access members when the sealable access members are in the second closed position to forcibly retain the sealable access members in the closed position.

3. The communications cabinet of claim 2 wherein the clip comprises a pair of clips attachable at spaced portions of the sealable access members.

4. The communications cabinet of claim 2 wherein the clip comprises:

an elongated clip extending over a substantial portion of the sealable access members; and an aperture formed in the clip allowing the at least one of the fiberoptic and the copper conductors extending through the aperture in the housing and the sealable access members to pass through the clip.

5. A communications cabinet providing connections between fiberoptic conductors and copper conductors and copper/fiber converters, the communications cabinet comprising:

a housing having walls, one wall having at least one aperture;

the copper/fiberoptic converters mounted in the housing; and sealable access members, mounted on the housing, sealingly enclosing the passage of fiberoptic conductors and copper conductors through the aperture in the wall of the housing, the sealable access means including;

a pair of brackets; and a pair of resilient members, each carried on one of the brackets and facing an opposed resilient member, the resilient members and the brackets movable relative to each other between a first spaced apart position allowing passage of an electrical conductor through the aperture into the interior of the housing, and a second closed position wherein the resilient members sealingly encompass substantially the entire peripheral surface of the conductor.

6. The communications cabinet of claim 5 further comprising:

a clip mountable over the brackets and the resilient members when the brackets and the resilient members are in the second closed position to forcibly retain the brackets and the resilient members in the closed position.

7. The communications cabinet of claim 6 wherein the clip comprises a pair of clips attachable at spaced portions of the brackets and the resilient members.

8. The communications cabinet of claim 6 wherein the clip comprises:

an elongated clip extending over a substantial portion of the brackets and the resilient members; and an aperture formed in the clip allowing a conductor extending through the aperture in the housing and the resilient members to pass through the clip.

\* \* \* \* \*